UNITED STATES PATENT OFFICE.

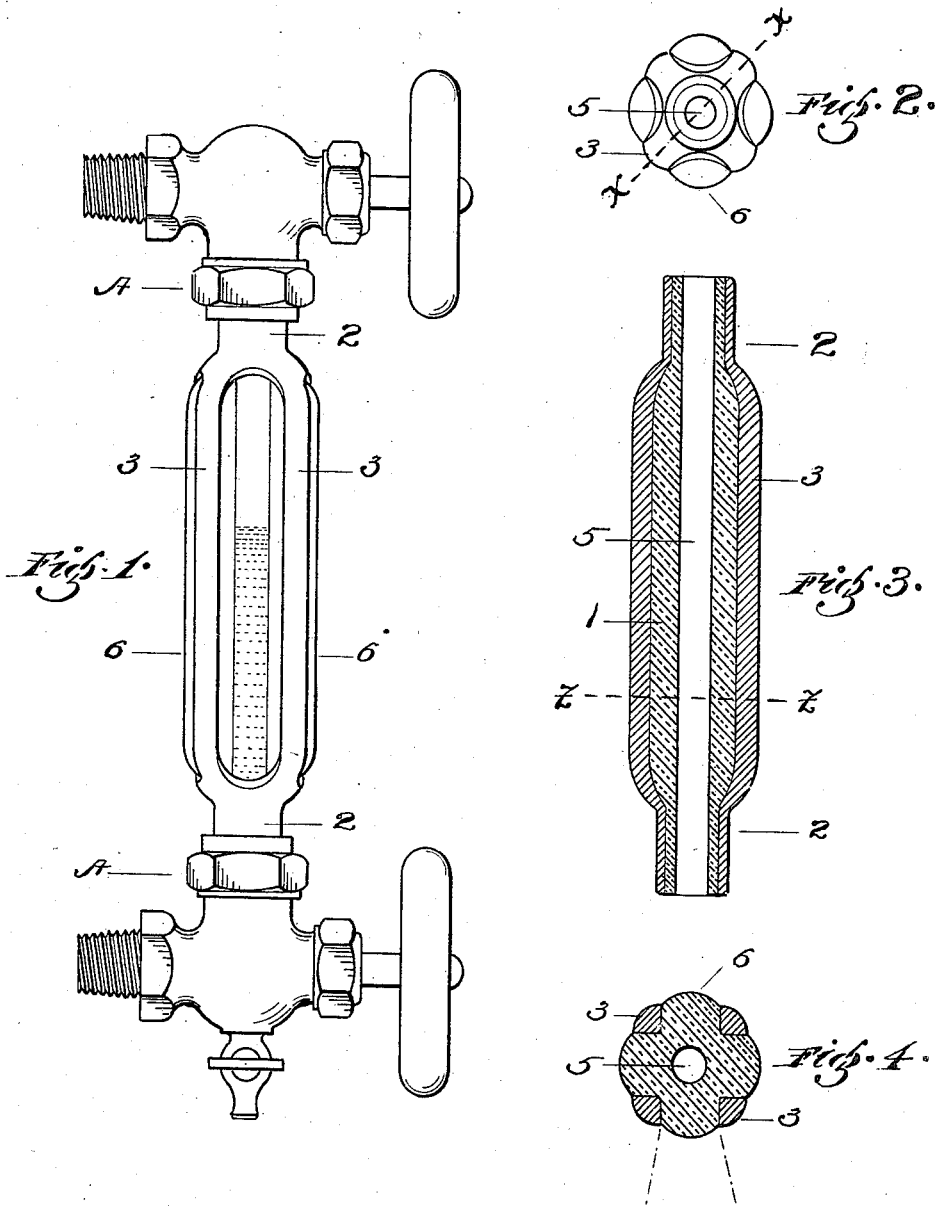

NICHOLAS ZUCKE, OF SPARKS, NEVADA.

WATER-GAGE GLASS.

966,289.

Specification of Letters Patent.

Patented Aug. 2, 1910.

Application filed July 29, 1908. Serial No. 445,977.

*To all whom it may concern:*

Be it known that I, NICHOLAS ZUCKE, residing in the city of Sparks, county of Washoe, and State of Nevada, have invented certain new and useful Improvements in Water-Gage Glasses; and I do hereby declare the following to be a full, clear, and exact description of the said invention, such as will enable others skilled in the art to which it most nearly appertains to make, use, and practice the same.

This invention relates to improvements in water gage glasses and consists of the novel construction and arrangement of the parts.

The object sought to be accomplished is to construct a water gage glass for steam boilers, and the like; so that the glass will be proof against breakage from internal pressure, external accidents, vibration, and the various destructive conditions to which such instruments are subject, while in use.

The ordinary type of gage glass consists of a glass tube of the desired diameter and length, adapted to be held between two valve connections placed respectively below, and above the water level of the boiler in such a manner that the water level will be visible within the glass tube. The glass tubes used in this manner, although made of the highest quality of Scotch glass and thoroughly tested, are subject to all the weaknesses due to the low tensile strength of glass. If such tubes become slightly scored or scratched, or show the smallest structural defect, the instant the hot water, and the boiler pressure is admitted the glass will "blow out" entailing delays, expense and great danger to the operator from flying glass, and scalding steam. To reduce these dangers as much as possible the naked glass tubes have been protected from external accident, by vertical rods extending between the valve mountings and surrounding the glass; but these precautions add no strength to the glass tube itself.

Broadly the invention consists of a gage glass fused into and surrounded by a cage-like, metallic sheath, having reduced extremities adapted to engage the stuffing boxes on the valve mountings used in ordinary practice; and longitudinal apertures disclosing the water column confined within the gage glass; and through which the convex surface of the glass protrudes giving a lens-like effect to magnify the size of the water column.

In the drawings: Figure 1— is a side elevation of a gage glass constructed and applied in accordance with this invention. Fig. 2— is an end view of the gage glass. Fig. 3— is a longitudinal cross section of the same taken on the line X—X of Fig. 2. Fig. 4— is a cross section of the same taken on the line Z—Z of Fig. 3.

In detail the construction consists of the gage glass #1, fused into a metallic cage comprising the diametrically reduced necks #2, and the enlarged body consisting of the ribs #3, having the apertures #4, between. The number of the apertures may be varied; four as illustrated being preferable as it gives four angles of vision, this however is not germane to the invention. The necks #2, are machined to give a smooth even surface to insert into the stuffing boxes A, within which it is sealed in the usual manner. Any suitable metal can be used to which glass can be attached by fusing; although it is not absolutely essential that the glass combine with the metal, so long as it adheres close enough to prevent leakage.

The usual practices of glass blowing are followed in constructing this invention, consisting in inclosing the metal cage within a form having an internal contour conforming to the outlines of the finished product, then casting the molten glass into the mold and blowing it into shape, leaving the longitudinal hole #5, forming the water column.

The convex form #6 given the glass where it is exposed through the apertures, while not a structural necessity, adds strength, and magnifies the size of the water column.

Having thus described this invention, what is claimed, and desired to secure by Letters Patent is:

1. A gage glass comprising a glass tube fused into and surrounded by a metallic sheath provided with reduced extremities.

2. A gage glass comprising a glass tube fused into and surrounded by a cage-like metallic structure provided with longitudinal apertures into which the outer face of said tube protrudes, the extremities of said metallic structure being reduced in diameter.

In testimony whereof, I have hereunto set my hand this 27th day of June, 1908.

NICHOLAS ZUCKE.

Witnesses:
SAM LOMBARD,
MARK VANONI.